(12) United States Patent
Hasan et al.

(10) Patent No.: US 12,546,276 B1
(45) Date of Patent: Feb. 10, 2026

(54) EGR AND INTAKE AIR MIXING MANIFOLD WITH PANCAKE PLENUM

(71) Applicant: Deere & Company, Moline, IL (US)

(72) Inventors: Anam Hasan, Bhilai (IN); Sathish Chennoju, Karimnagar (IN); Arpan Patel, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/911,465

(22) Filed: Oct. 10, 2024

(51) Int. Cl.
*F02M 26/19* (2016.01)
*F02M 35/10* (2006.01)
*F02M 35/104* (2006.01)

(52) U.S. Cl.
CPC ...... *F02M 26/19* (2016.02); *F02M 35/10052* (2013.01); *F02M 35/10222* (2013.01); *F02M 35/10262* (2013.01); *F02M 35/104* (2013.01)

(58) Field of Classification Search
CPC ............. F02M 26/19; F02M 35/10052; F02M 35/10222; F02M 35/10262; F02M 35/104
See application file for complete search history.

(56) References Cited

U.S. PATENT DOCUMENTS

| | | |
|---|---|---|
| 5,492,093 A | 2/1996 | Rygiel |
| D374,446 S | 10/1996 | Bendell |
| 6,425,382 B1 | 7/2002 | Marthaler et al. |
| 6,945,237 B1 | 9/2005 | Sullivan et al. |
| 7,069,919 B1 | 7/2006 | Atkinson et al. |
| 7,568,340 B2 | 8/2009 | Marsal et al. |

(Continued)

FOREIGN PATENT DOCUMENTS

| | | |
|---|---|---|
| JP | 2009144653 A | 7/2009 |
| KR | 20040091244 A | 5/2006 |

(Continued)

OTHER PUBLICATIONS

Dhatkar, S., S K, R., Garg, S., Emran, A. et al., "EGR Mixer Optimization for Achieving Uniform Cylinder EGR Distribution Using 1D-3D CFD Coupled Simulation Approach to Meet Future Stage V Emission Legislation in India," SAE Technical Paper 2020-28-0390, 2020, https://doi.org/10.4271/2020-28-0390. [Abstract].

(Continued)

*Primary Examiner* — Syed O Hasan
(74) *Attorney, Agent, or Firm* — KLINTWORTH & ROZENBLAT LLP

(57) ABSTRACT

Disclosed is a mixing manifold for mixing intake air and exhaust gas recirculation (EGR) air in an engine system. The mixing manifold includes a manifold chamber into which the intake air and the EGR air are received, the manifold chamber being an open, no mix-type chamber devoid of turbulence-inducing passages. The mixing manifold further includes a throat section having an upper end at the manifold chamber and extending along a longitudinal axis to a lower end, the lower end having a cross-section that is less than a cross-section of the upper end. The mixing manifold further includes a plenum having a pancake body with an upper wall at the lower end of the throat section and a lower wall spaced from the upper wall by side walls defining an interior volume leading from the throat section to a front outlet opening.

19 Claims, 13 Drawing Sheets

(56) References Cited

U.S. PATENT DOCUMENTS

| | | |
|---|---|---|
| 9,228,539 B2 | 1/2016 | Mahakul et al. |
| D907,667 S | 1/2021 | Kanare |
| D962,994 S | 9/2022 | Wei |
| D971,965 S | 12/2022 | Murugesan et al. |
| D981,452 S | 3/2023 | Wei |
| D1,044,871 S | 10/2024 | Koch |
| D1,050,187 S | 11/2024 | Ye |
| D1,078,795 S | 6/2025 | Ratkowiak |
| 2002/0088443 A1 | 7/2002 | Marthaler et al. |
| 2005/0199230 A1 | 9/2005 | Sullivan et al. |
| 2006/0060172 A1* | 3/2006 | Liu ............... F02M 26/19 123/568.17 |
| 2006/0144375 A1 | 7/2006 | Atkinson et al. |
| 2013/0000617 A1 | 1/2013 | Luft et al. |
| 2014/0366852 A1* | 12/2014 | Liening ............ F02M 26/19 123/568.11 |
| 2016/0160804 A1* | 6/2016 | Dettloff ............ B01F 23/10 123/568.17 |
| 2019/0338717 A1 | 11/2019 | Nagao et al. |
| 2020/0256266 A1* | 8/2020 | Mastbergen ......... F02M 26/10 |

FOREIGN PATENT DOCUMENTS

| | | |
|---|---|---|
| WO | WO2015101030 A1 | 7/2015 |
| WO | WO2020199285 A1 | 10/2020 |

OTHER PUBLICATIONS

Agrawal, A., Raju, K., Santra, T., Gopinathan, N. et al., "Optimization of EGR Mixer to Minimize Thermal Hot Spot on Plastic Duct & Soot Deposition on Throttle Valve Using CFD Simulation," SAE Technical Paper 2019-26-0286, 2019, https://doi.org/10.4271/2019-26-0286. [Abstract].

* cited by examiner

EGR AND INTAKE AIR MIXING MANIFOLD WITH PANCAKE PLENUM

STATEMENT OF FEDERALLY SPONSORED RESEARCH OR DEVELOPMENT

Not applicable.

FIELD OF THE DISCLOSURE

This disclosure generally relates to mixing intake air and exhaust gas to form exhaust gas recirculation (EGR) air in an engine system.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Internal combustion engines, including various compression ignition engines (such as diesel engines), combust fuel to generate power for tractive and work operations of these work vehicles. Combustion of fuel can generate harmful gases that can be exhausted from the work vehicle. For example, combustion of diesel fuel may generate oxides of nitrogen (NOx) and other gases. Exhaust gas recirculation (EGR) is a technique to reduce the NOx emissions out of the engine. For EGR techniques exhaust gas out of the engine is combined with fresh air and then sent into the engine to reduce the amount of oxygen entering the engine. A mixing chamber can be used to combine the exhaust gas with the fresh air before the EGR gas is sent into the engine. The goal of the mixing chamber is to combine the fresh air and exhaust gas into a uniform distribution and then have the uniform distribution enter the engine. The uniform distribution of the EGR gas between the cylinders is desirable to improve the control of NOX emissions out of the engine.

SUMMARY OF THE DISCLOSURE

In one implementation, a mixing intake air and exhaust gas recirculation (EGR) air in an engine system is disclosed. The mixing manifold includes a manifold chamber into which the intake air and the EGR air are received. The manifold chamber being an open, no mix-type chamber devoid of turbulence-inducing passages or devices promoting mixing of the EGR air with the intake air. The mixing manifold further includes a throat section having an upper end at the manifold chamber and extending along a longitudinal axis to a lower end. The lower end has a cross-section that is less than a cross-section of the upper end. The mixing manifold further includes a plenum having a pancake body with an upper wall at the lower end of the throat section and a lower wall spaced from the upper wall by side walls defining an interior volume leading from the throat section to a front outlet opening. The upper wall is spaced from the lower wall by a longitudinal dimension along the longitudinal axis that is less than a lateral dimension of the pancake body between the side walls. The front outlet opening is positioned a distance lateral from the longitudinal axis.

In an example of the mixing manifold, the front outlet opening has an oblong shape with a longitudinal dimension shorter along the longitudinal axis than a lateral dimension perpendicular to the longitudinal axis. In a further example of the mixing manifold, the plenum expands toward the front outlet opening so its longitudinal dimension at the front outlet opening is greater than the longitudinal dimension between the upper wall and the lower wall at a position on the pancake body at the lower end of the throat section and its lateral dimension is greater than the lateral dimension between the side walls at the position. In a further example of the mixing manifold, the upper wall toward the front outlet opening expands away from the lower wall in the longitudinal direction.

In a further example of the mixing manifold, the plenum includes an interface flange surrounding the front outlet opening with bolt holes for coupling the mixing manifold to an engine of the engine system. In a further example of the mixing manifold, the lower wall has a rounded protrusion that extends toward the upper wall and extends a length of the lower wall.

In a further example of the mixing manifold, intake air and EGR air enter the manifold chamber and move down through the throat section to the plenum, the plenum causing turbulence in the intake air and EGR air promoting mixing of the intake air and EGR air prior to the mixed intake air and EGR air exiting at the front outlet opening. In a further example of the mixing manifold, a velocity of the intake air and the EGR air is increased through the throat section due to the cross-section of the upper end narrowing to the cross-section of the lower end, wherein the plenum causes the EGR air and the intake air to spiral as the EGR air and intake air move toward the front outlet opening, and wherein the spiraling causes the turbulence in the intake air and the EGR air promoting mixing of the intake air and EGR.

In a further example of the mixing manifold, the side walls are spanned by a rear wall opposite the front outlet opening that is curved in the lateral dimension of the pancake body within a reference plane perpendicular to the longitudinal axis. In a further example of the mixing manifold, the rear wall and side walls are formed integrally as a unitary part and define a smooth interior surface; and the smooth interior surface of the rear wall and the side walls are rounded at the upper wall and lower wall in the longitudinal dimension of the pancake body. In a further example of the mixing manifold, the manifold chamber, the throat section, and the plenum have smooth interior surfaces, and wherein the manifold chamber, the throat section, and the plenum are formed integrally as a unitary part.

In a further example of the mixing manifold, the manifold chamber includes an upper opening through which the intake air is received and a side opening through which the EGR air is received, and the upper opening is opposite a lower opening to the throat section. In a further example of the mixing manifold, the upper opening in the manifold chamber couples an intake pipe to the manifold chamber; and the side opening of the manifold chamber couples to an EGR intake pipe.

In one implementation, an air intake arrangement for an engine system is disclosed. The air intake arrangement includes an intake pipe configured to deliver a flow of intake air, an exhaust gas recirculation (EGR) pipe configured to deliver a flow of EGR air, and a mixing manifold for mixing intake air and exhaust gas recirculation (EGR) air in an engine system. The mixing manifold includes a manifold chamber into which the intake air from the intake pipe and the EGR air from the EGR pipe are received. The manifold chamber being an open, no mix-type chamber devoid of turbulence-inducing passages or devices promoting mixing of the EGR air with the intake air. The mixing manifold further includes a throat section having an upper end at the manifold chamber and extending along a longitudinal axis to a lower end. The lower end having a cross-section that is less than a cross-section of the upper end. The mixing manifold further includes a plenum having a pancake body with an upper wall at the lower end of the throat section and a lower wall spaced from the upper wall by side walls defining an interior volume leading from the throat section to a front outlet opening. The upper wall is spaced from the lower wall by a longitudinal dimension along the longitudinal axis that is less than a lateral dimension of the pancake body between the side walls. The front outlet opening is positioned a distance lateral from the longitudinal axis.

In an example of the air intake arrangement, the front outlet opening has an oblong shape with a longitudinal dimension shorter along the longitudinal axis than a lateral dimension perpendicular to the longitudinal axis. The plenum expands toward the front outlet opening so its longitudinal dimension at the front outlet opening is greater than the longitudinal dimension between the upper wall and the lower wall of the pancake body and its lateral dimension is greater than the lateral dimension between the side walls of the pancake body. The plenum expands toward the front outlet opening in the longitudinal direction away from both the upper wall and the lower wall. In a further example of the air intake arrangement, the plenum includes an interface flange surrounding the front outlet opening with bolt holes for coupling the mixing manifold to an engine of the engine system, and the lower wall has a rounded protrusion that extends toward the upper wall and extends a length of the lower wall.

In a further example of the air intake arrangement, intake air and EGR air enter the manifold chamber and move down through the throat section to the plenum. The plenum causing turbulence in the intake air and EGR air promoting mixing of the intake air and EGR air prior to the mixed intake air and EGR air exiting at the front outlet opening. A velocity of the intake air and the EGR air is increased through the throat section due to the cross-section of the upper end narrowing to the cross-section of the lower end. The plenum causes the EGR air and the intake air to spiral as the EGR air and intake air move toward the front outlet opening. The spiraling causes the turbulence in the intake air and the EGR air promoting mixing of the intake air and EGR.

In a further example of the air intake arrangement, the side walls are spanned by a rear wall opposite the front outlet opening that is curved in the lateral dimension of the pancake body within a reference plane perpendicular to the longitudinal axis. The rear wall and side walls are formed integrally as a unitary part and define a smooth interior surface. The smooth interior surface of the rear wall and the side walls are rounded at the upper wall and lower wall in the longitudinal dimension of the pancake body. In a further example of the air intake arrangement, the manifold chamber, the throat section, and the plenum have smooth interior surfaces, and the manifold chamber, the throat section, and the plenum are formed integrally as a unitary part.

In a further example of the air intake arrangement, the manifold chamber includes an upper opening through which the intake air is received and a side opening through which the EGR air is received. The upper opening is opposite a lower opening to the throat section, the upper opening in the manifold chamber couples the intake pipe to the manifold chamber; and the side opening of the manifold chamber couples to the EGR pipe.

Other features and aspects will become apparent by consideration of the detailed description, claims, and accompanying drawings.

Figure 1:
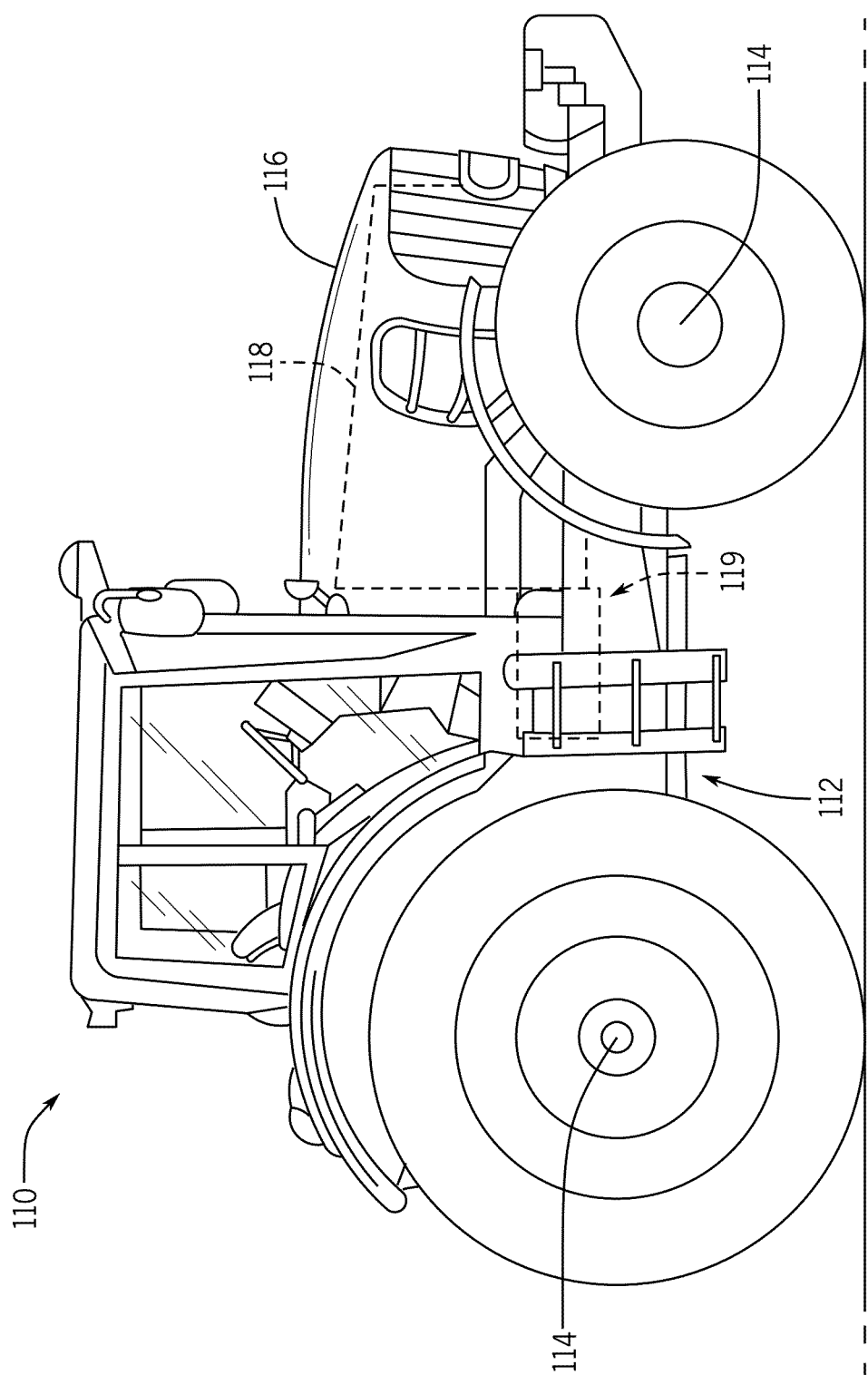
FIG. 1 is a simplified elevational view of an example work vehicle in the form of an agricultural tractor in which a mixing manifold of the present disclosure may be incorporated, according to at least one aspect of the present disclosure.

Throughout the drawings, identical reference numbers designate the same element. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following disclosure describes one or more example embodiments of the disclosed mixing manifold for a work vehicle as shown in the accompanying figures of the drawings described briefly above. Various modifications to the example embodiments may be contemplated by one of skill in the art. Discussion herein focuses on the mixing manifold for an engine system being for a work vehicle, such as an agricultural tractor, but the mixing manifold disclosed herein may be utilized in other contexts, including other work vehicle platforms in the agriculture, construction, forestry, mining, and other industries.

Overview

Engines for heavy-duty work vehicles can generate harmful gases from the combustion of fuel. For example, combustion of diesel fuel may generate oxides of nitrogen (NOx) and other gases. Exhaust gas recirculation (EGR) is a technique to reduce the NOx emissions out of the engine. For EGR techniques exhaust gas out of the engine is combined with fresh air and then sent into the engine to reduce the amount of oxygen entering the engine. The fresh air and EGR gas needs to be mixed to a uniform distribution that enters the cylinders of the engine to improve the control of the NOX emissions out of the engine.

The present disclosure provides a mixing manifold that receives EGR gas and fresh air and outputs a uniform distribution of EGR gas and fresh air into the cylinders of an engine. The mixing manifold allows for the mixing to occur in a short overall length before entering the engine. The short mixing length allows the mixing manifold to be used with engines that have little space for the mixing of the EGR gas and fresh air. While the mixing manifold is designed to perform the mixing of the EGR gas and fresh air over a short length, there is no reason that the mixing manifold cannot be used with engine systems that have a large length for the mixing of EGR gas and fresh air.

The mixing manifold can be used with different types of intake manifolds. For example, some engines have integrated intake manifolds, where the intake manifold is integrated into the cylinder heads of the engine. As another example, some engines have the intake manifold as a separate part from the cylinder heads. Generally, the integrated intake manifold has a shorter length for mixing the EGR gas and fresh air than the separate intake manifold. In either case, the short mixing length of the mixing manifold allows the mixing manifold to be used with either of these types of manifolds.

The short mixing length is facilitated by the design of the mixing manifold. The mixing manifold includes a manifold chamber, a throat section, and a pancake shaped plenum. The EGR air and fresh air enter at the manifold chamber pass through the throat section to reach the plenum and then exit the plenum. The throat section creates an optimum restriction for the fresh air and EGR gas to create desirable mixing and streamlined flow which is followed by subsequent expansion in the pancake plenum. There is a minor pressure drop from the manifold chamber to the exit of the pancake plenum due to the restriction at the throat. This pressure drop is small and does not greatly affect engine performance while promoting mixing of the fresh air and EGR gas. The restriction of the fresh air and EGR gas mixture at the throat and expansion at the pancake plenum creates turbulence and eddies at the entrance to the throat and within the pancake plenum which causes additional mixing followed by distribution towards front and rear cylinders of the engine. This process allows the mixing to be performed within a short distance making the mixing manifold applicable to many engines and applications.

The manifold chamber receives the EGR gas and the fresh air. The manifold chamber is an open, no mix-type chamber devoid of turbulence-inducing passages or devices promoting mixing of the EGR air with the intake air in the manifold chamber. For example, the manifold chamber is an open volume that receives the EGR gas and the fresh air. The manifold chamber has an EGR pipe coupling to couple to an EGR pipe to receive the EGR gas and an intake coupling to couple to an intake pipe to receive the fresh air. In one aspect, the EGR pipe coupling is flush with the internal surface of the manifold chamber. In an alternative aspect, the EGR pipe coupling extends internally past the internal surface and into the manifold chamber. In either case, the EGR air and fresh air are directed out of the manifold chamber to the throat section.

The throat section extends from an upper end at the input along a longitudinal axis to an output at a lower end. The lower end having a cross-section that is less than a cross-section of the upper end. In one aspect, the throat section can have a gradual internal diameter reduction from the throat section input to the throat section output. For example, the diameter reduction can be approximately 30 percent from the input to the output. In an alternative aspect, the throat section can have a constant internal diameter from input to output with the throat section diameter being less than the diameter of the manifold chamber. For example, the diameter of the throat section can be 30 percent less than the diameter of the manifold chamber. In either aspect, the throat section can be approximately 40 mm in length promoting the short overall mixing distance. In either aspect, the velocity of the EGR gas and fresh air is increased as it passes through the throat section due to the decrease in diameter compared to the manifold chamber. The EGR gas and fresh air enter the plenum from the throat section.

The plenum has a body shape similar to a pancake. The plenum includes an upper wall at the lower end of the throat section and a lower wall spaced from the upper wall by side walls and a rear wall defining an interior volume leading from the throat section to a front outlet opening. In some aspects, the front outlet opening is approximately a 90 degree turn from the input of the throat section. The upper wall is spaced from the lower wall by a longitudinal dimension that is less than a lateral dimension of the pancake body between the side walls. For example, the pancake plenum can have a width of approximately 2 times, a length of approximately 1.7 times, and a height of 0.7 times the exit diameter of throat. The shape of the plenum allows for an expansion of the EGR gas and fresh air mixture into the pancake plenum following the restriction caused by the throat section. The expansion is desired to create the turbulence needed to promote mixing of the EGR gas and fresh air. Additionally, the interior dimensions of the plenum expand toward the front outlet opening promoting more turbulence in the mixture.

The turbulence is caused by the path the EGR gas and fresh air take through the plenum. For example, the EGR gas and fresh air mixture enter the plenum at the upper wall and the mixture rebounds off of the lower wall and is directed in all directions. At least a portion of the mixture is directed towards the side walls and rear wall of the plenum where the mixture follows the side walls and rear wall back to the upper wall and is directed toward the front outlet opening. This looping path causes some of the mixture to spiral toward the front outlet opening promoting a more uniform mixture of the EGR gas and fresh air. In some aspects, there are two spirals with one being on the left side of the front outlet opening and the other being on the right side of the outlet opening. The front outlet opening is attached to the intake manifold of the engine allowing the more uniform mixture of the EGR gas and fresh air to be distributed to the cylinders of the engine.

The mixing manifold can be integrally formed out of one unitary part that includes the manifold chamber, the throat section, and the plenum. The different sections can flow into each other smoothly allowing for easier manufacturing of the mixing manifold. For example, the manifold chamber can be a no mix-type chamber devoid of turbulence-inducing passages, which makes the manufacturing easier since internal passages in the manifold chamber are not needed for the EGR and fresh air mixing. One example manufacturing method that can produce the mixing manifold is die casting that allows the mixing manifold to be economically manufactured.

One or more example embodiments of a mixing manifold for an engine of a work vehicle are provided in the figures of the present disclosure. The following description should be understood as merely providing a non-limiting example context in which embodiments of the present disclosure may be better understood.

Example Mixing Manifold for a Work Vehicle Engine

Referring to FIG. 1, a work vehicle 110 is shown that can implement embodiments of the disclosure. In the illustrated example, the work vehicle 110 is depicted as an agricultural tractor. It will be understood, however, that other configurations may be possible, including configurations with the work vehicle 110 as a different kind of tractor, a harvester, a log skidder, a grader, or one of various other work vehicle platforms. The work vehicle 110 includes a chassis or frame 112 carried on front and rear wheels (or tracks) 114. Positioned on a forward end region of the chassis 112 is an engine housing 116 within which is located an engine system 118. The engine system 118 provides power via an associated powertrain 119 to an output member (e.g., an output shaft, not shown) that, in turn, transmits power to axle(s) of the work vehicle 110 to provide propulsion thereto and/or to a power take-off shaft for powering an implement on or associated with the work vehicle 110, for example.

Figure 2:
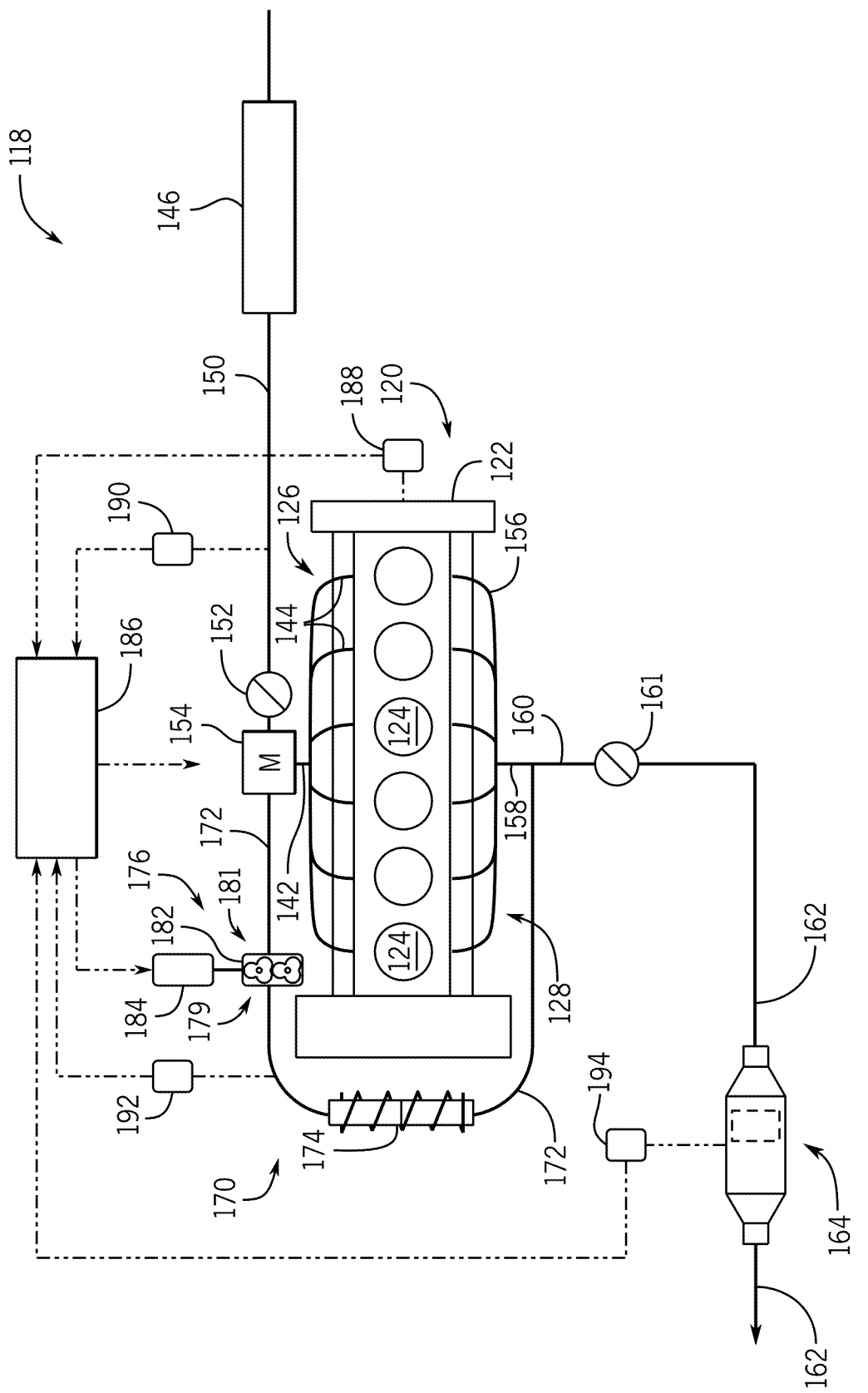
FIG. 2 is a schematic diagram of an example engine system of the work vehicle of FIG. 1, according to at least one aspect of the present disclosure.

The engine system 118 is illustrated in greater detail in FIG. 2 in accordance with an example implementation. Referring to FIG. 2, the engine system 118 includes an internal combustion engine 120 (hereafter, "engine") that, in different embodiments, may be a compression- or spark-ignition internal combustion engine. The engine 120 of the engine system 118 includes an engine block 122 having a plurality of piston-cylinder arrangements 124 that operate to cause combustion events. In the illustrated implementation, the engine 120 is an inline-6 (I-6) compression ignition (e.g., diesel) engine defining six piston-cylinder arrangements 124; however, in alternative implementations various engine styles and layouts may be used.

The engine system 118 also includes an intake manifold 126 fluidly connected to the engine 120 and an exhaust manifold 128 fluidly connected to the engine 120. In some aspects, the intake manifold 126 is integrated with the cylinder heads. The intake manifold 126 includes a mixing manifold 154, a manifold input 142, and a plurality of outputs 144 in fluid communication with a corresponding piston-cylinder arrangement 124 to direct a supply of air thereto. Fresh air is drawn from the ambient environment through an air intake 146 that may include one or more intake components (e.g., an air filter, an air cooler, etc.) disposed in an air intake passageway 150 that leads to an air intake throttle valve 152 and then to the mixing manifold 154. The air intake 148 (via an air cooler) may reduce the temperature of the intake air prior to it being provided to the engine 120 to increase the density of the intake air for improved volumetric efficiency. The mixing manifold 154 receives exhaust gas through an EGR passageway 172 and air through the intake throttle valve 152. The goal of the mixing manifold 154 is to mix the air and the exhaust gas to form EGR gas with a uniform distribution of the air and the exhaust gas. The mixing manifold 154 outputs the EGR gas into the manifold input 142 where the EGR gas flows through the plurality of outputs 144. As such, the air intake throttle valve 152 and the mixing manifold 154 regulate and facilitate delivery of the fresh air provided through the intake manifold 126.

The exhaust manifold 128 of the engine system 118 includes a plurality of secondary exhaust passages 156, each in fluid communication with a corresponding piston-cylinder arrangement 124, that direct exhaust gases generated by the engine 120 to a main outlet 158 and into an exhaust gas passageway 160. Exhaust gas produced by the engine 120 is directed out from the exhaust manifold 28, passes through the exhaust gas passageway 160, through an exhaust throttle valve 161, through an aftertreatment passageway 162, and into an aftertreatment system 164. The aftertreatment system 64 treats the exhaust gas prior to the exhaust gas being vented to the ambient environment via an exhaust outlet 165. The aftertreatment system 64 may include one or more components or devices that further treat the exhaust gas such as a selective catalyst reduction (SCR) catalyst, a diesel oxidation catalyst, a diesel particulate filtration (DPF) device, and the like.

An exhaust gas recirculation (EGR) system 170 is further provided in the engine system 118 that functions to recirculate a portion of the exhaust gas generated by the engine 120 and thereby reduce the formation of NOx during combustion. Exhaust gas is drawn from the exhaust manifold 128 and recirculated into the intake manifold 126 via the EGR system 170. The EGR system 170 includes an EGR passageway 172, an EGR cooler 174, and an EGR pump 176. The EGR passageway 172 draws in a portion of the exhaust gas that is flowing within the exhaust gas passageway 160 for circulation through the EGR system 170.

The EGR passageway 172 draws in exhaust gas from the exhaust gas passageway 60 at a location upstream from the exhaust throttle valve 161. The EGR cooler 174 is disposed in-line with the EGR passageway 172 for the purpose of cooling the exhaust gas flowing through the EGR passageway 172 and may be upstream of the EGR pump 176 (as shown in FIG. 2) or downstream of the EGR pump 176. The EGR pump 176 has an inlet side 179 in fluid communication with the exhaust manifold and an outlet side 181 in fluid communication with the intake manifold 126. For example, the outlet side 181 may be in fluid communication with the mixing manifold 154. In one embodiment, the EGR pump 176 is constructed as a roots style pump having rotors 182 driven by an electric motor 184. The EGR pump 176 may be electrically controlled to selectively control the flow of exhaust gas recirculated from the exhaust gas passageway 160 to the engine 120 via the EGR passageway 172. As such, the EGR pump 176 and the mixing manifold 154 regulate and facilitate delivery of the exhaust gas provided through the intake manifold 126.

The EGR pump 176 is configured as a reversible pump that is operable in two different modes—a forward mode and a reverse mode—with the EGR pump 176 being electrically controlled to selectively control the mode of operation thereof. In the forward mode, the EGR pump 176 operates to recirculate a portion of the exhaust gas from the exhaust gas passageway 160 into the intake manifold 126. In the reverse mode, the EGR pump 176 operates in reverse from the forward mode to prevent leakage of exhaust gas therethrough, as may occur if the EGR pump 176 were simply turned off when not operating in the forward mode. When operating in the reverse mode, the speed of the EGR pump 176 may be controlled to determine a flow output therefrom, with the EGR pump operable at a speed that substantially prevents flow of exhaust gas therethrough (i.e., a zero flow) or at a speed that provides a non-exhaust air (i.e., fresh air) flow therethrough in an opposite direction from that of the exhaust gas flow.

Referring to FIG. 2, the engine system includes a control system 186 and various sensors including: an engine speed sensor 188; one or more sensor(s) 190 disposed in the intake manifold 126 or the air intake passageway 150 that measure any or more of mass airflow, air temperature, and air pressure in the air intake manifold 126 and/or air intake passageway 150; one or more sensor(s) 192 in the exhaust manifold 56 that may measure any or all of an oxygen level, temperature, and pressure of exhaust generated by the engine 120; one or more aftertreatment sensors 194 that determine the condition of the aftertreatment system 164. For example, the condition of the aftertreatment system 164 can include an amount of soot trapped in a DPF device, an amount of sulfur or other contaminant accumulated in a component of the after treatment system 64, and/or a temperature of a component of the after treatment system 164.

The control system 86 monitors signals or data received from the sensors 188, 190, 192, and 194 described above and adjusts operation of the engine system 118 and other components to ensure the work vehicle 110 is able to meet the demands placed on work vehicle 110 by an operator while managing fuel efficiency and reduction of hazardous exhaust gases released into the ambient environment. For example, the control system 86 can include an engine control unit (ECU) that optimizes operation of the engine 120, an operator interface controller, a climate control system, a traction system controller, an accessory and/or hydraulic system controller, and various others. The various controllers can exchange signals and/or data therebetween as necessary to maintain efficient and clean operation of the engine system 118 (and thereby the work vehicle 110).

The various controllers of the control system 186 may be implemented using hardware, software, firmware, or combinations thereof. Such controllers of the control system 86 may be implemented by one or more suitably programmed computer-based device(s), some or each having a processing module and a memory. The memory having stored therein, among other things, programming instructions executed by one or more processing modules to cause the various controllers to undertake functions of the engine system 118. Each computer-based device may comprise, e.g., a computer, a device using one or more application specific integrated circuits (ASIC's) and/or field-programmable gate arrays (FPGA's), and/or combinations thereof. Such devices may be unitary or may be distributed multiple computing devices, and one or more such computing devices may be installed locally on or remote from the work vehicle 110. Each computing device may communicate with another computing device over one or more network(s) such as a local area network (LAN), a control area network (CAN), a cellular network, a wide area network (WAN) such as the Internet, and the like. One or more controllers of the control system 186 may be also coupled to and responsive to one or more user device(s) (not shown) such as a keyboard, a mouse, a display, a touchscreen, a joystick, etc. (not shown) via which an operator may monitor and direct operation of the work vehicle 110.

Figure 3:
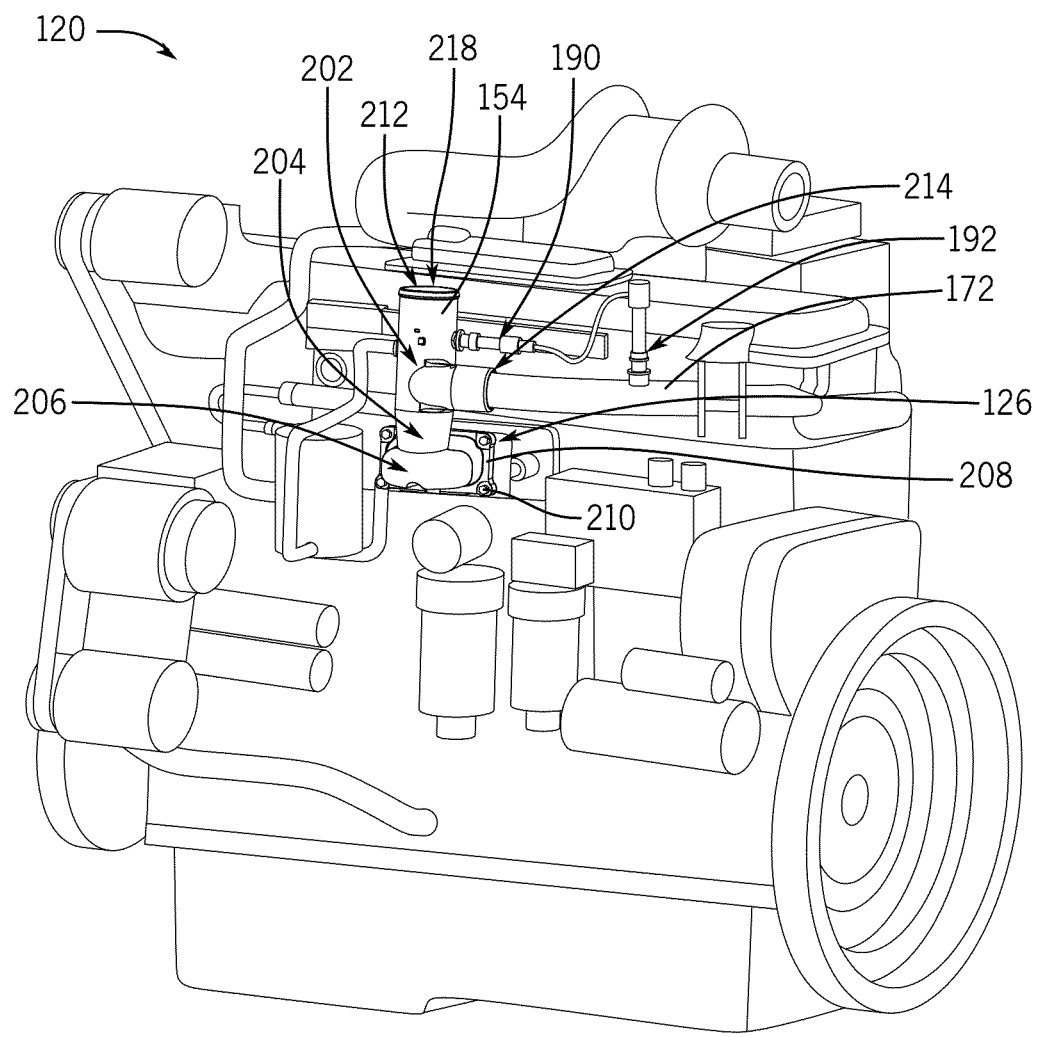
FIG. 3 is a simplified perspective view of the example engine for the engine system of FIG. 2.
Figure 4:
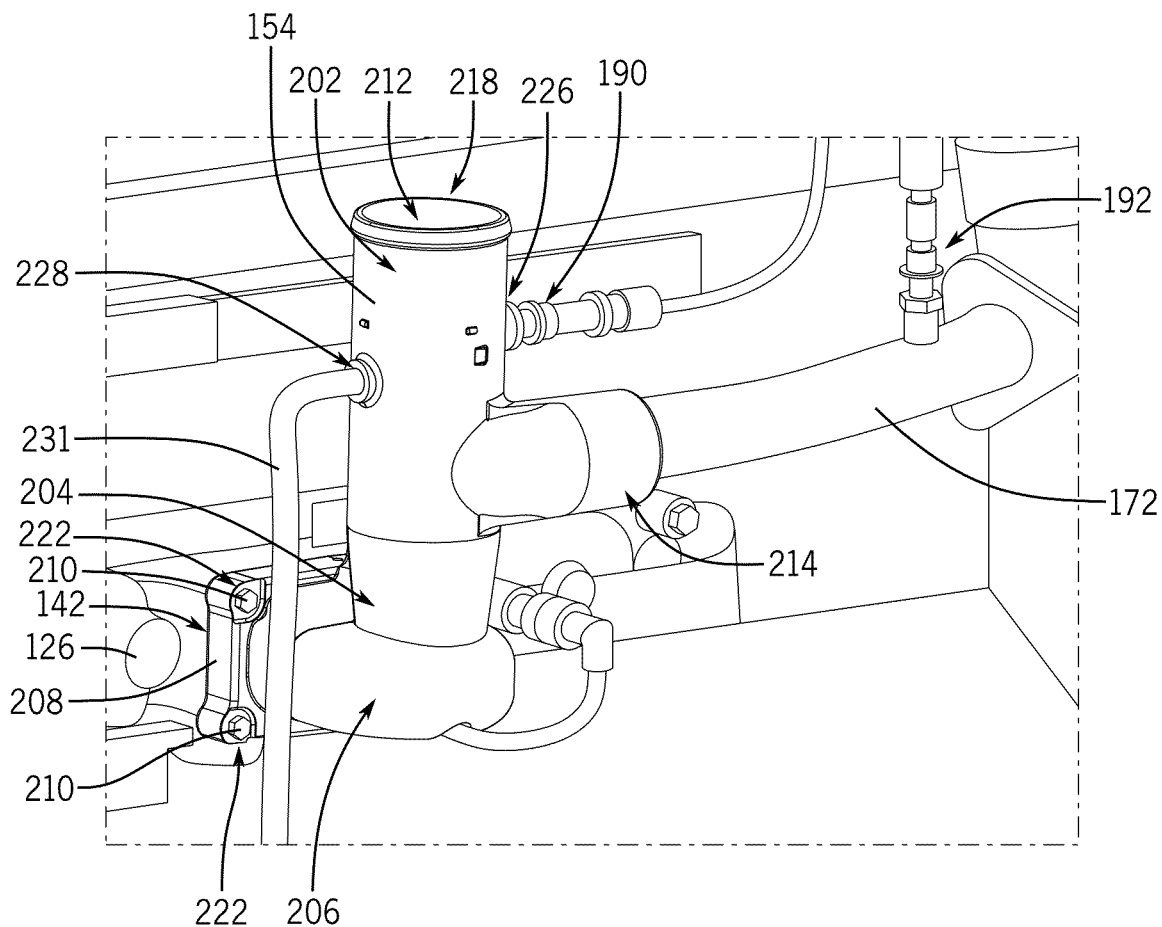
FIG. 4 is a simplified and enlarged detailed view of the example mixing manifold attached to the example engine of FIG. 3, according to at least one aspect of the present disclosure.
Figure 5:
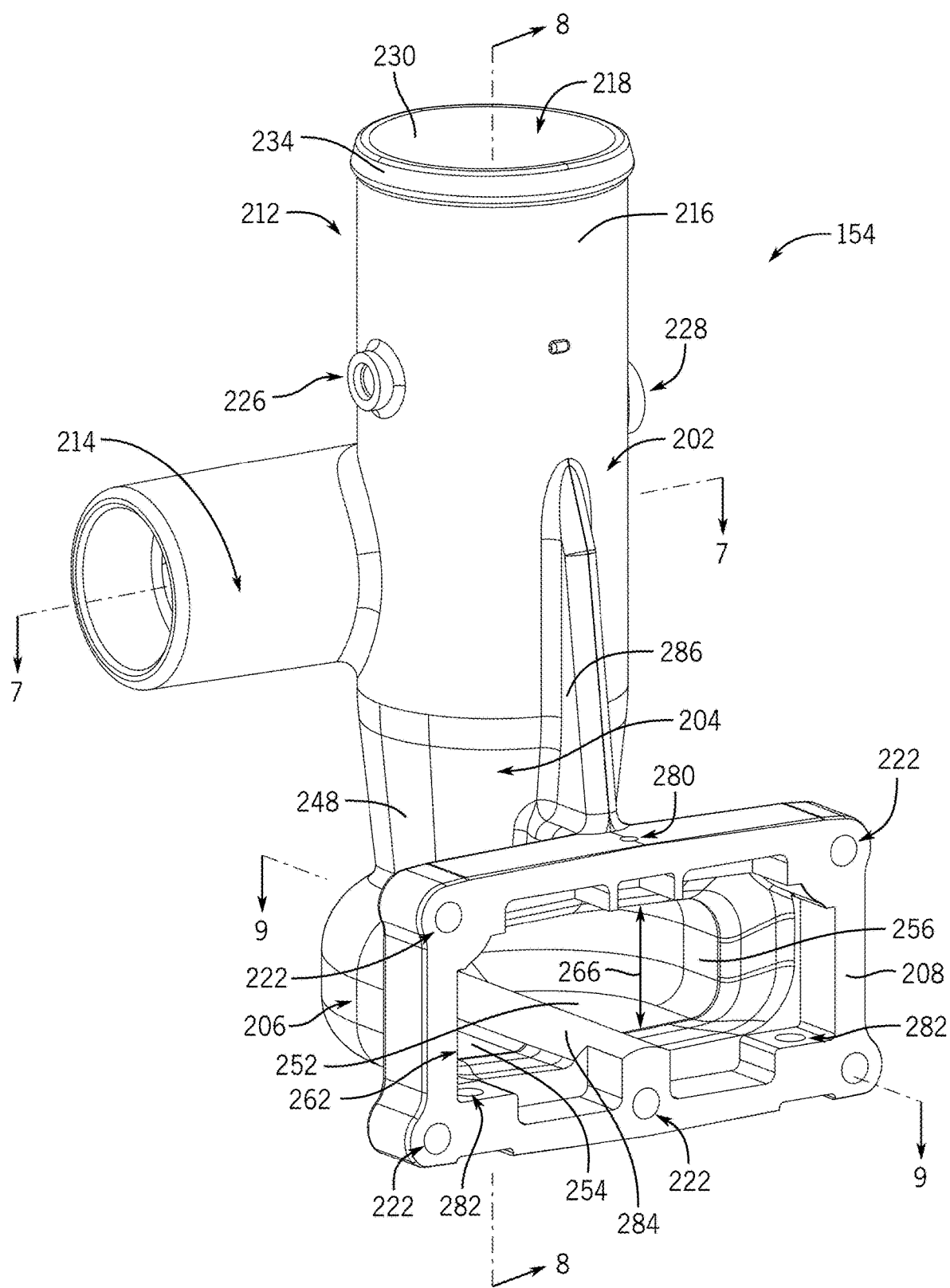
FIG. 5 is a perspective view of the example mixing manifold of FIG. 4.
Figure 6:
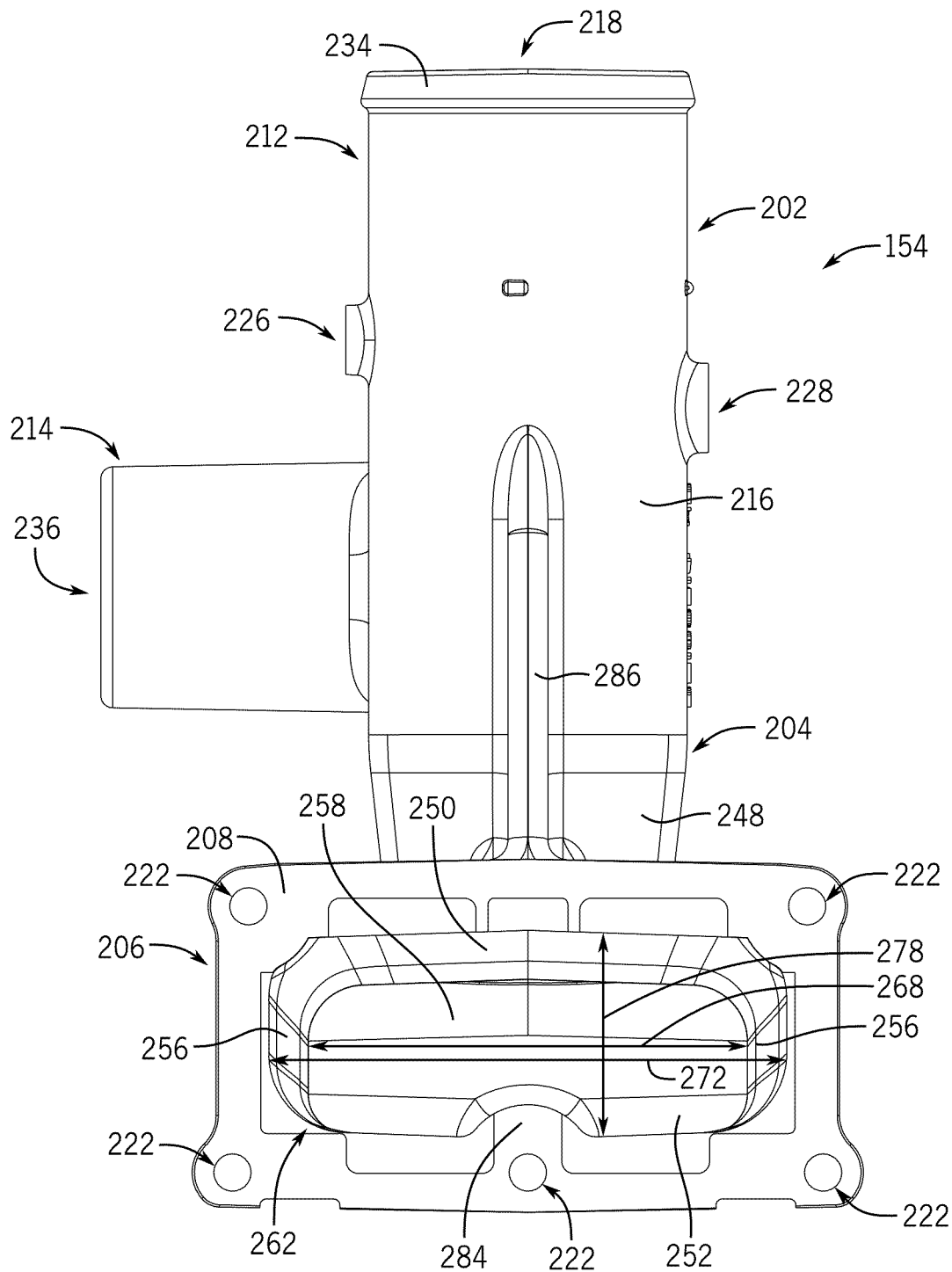
FIG. 6 is a front plan view of thereof.

Referring also to FIGS. 3 and 4, the mixing manifold 154 is attached to the intake manifold 126 of the engine 120. The mixing manifold includes a manifold chamber 202, a throat section 204, and a plenum 206. In at least one aspect, the manifold chamber 202, the throat section 204, and the plenum 206 are formed integrally as a unitary part. The internal surfaces of the manifold chamber 202, the throat section 204, and the plenum 206 are smooth and smoothly transition from one section to another. In at least one aspect, the plenum 206 includes an interface flange 208 that can be attached to the intake manifold 126 at a manifold input 142. For example, the interface flange 208 can include bolt holes 222 and bolts 210 can pass through the bolt holes 222 to attached the interface flange 208 to the manifold input 142.

The manifold chamber 202 includes an intake coupling 212 and an EGR coupling 214. The intake coupling 212 has an upper opening 218 through which fresh air is received. An intake pipe (not shown) can be attached to the intake coupling 212 to supply fresh air to the mixing manifold 154 through the upper opening 218. For example, the intake coupling 212 can include a protrusion 234 that allows sealing against a hose. The EGR coupling 214 defines a side opening 220 through which EGR gas from the exhaust manifold 128 is received. An EGR passageway 172 can be attached to the EGR coupling 214 to supply EGR gas to the mixing manifold 154 through the side opening 220. For example, the EGR passageway 172 can be inserted into the EGR coupling 214 in opening 236 to attach the EGR passage way 172 to the EGR coupling 214. The manifold chamber 202 is an open, no mix-type chamber devoid of turbulence-inducing passages or devices promoting mixing of the EGR air with the intake air.

The properties of the fresh air can be monitored by the control system 186 through the sensor 190 and the properties of the EGR gas can be monitored by the sensor 192. The amount, temperature, etc. of the fresh air and the EGR gas can be controlled by the control system 186 before the fresh air and EGR gas enter the manifold chamber 202.

Figure 7:
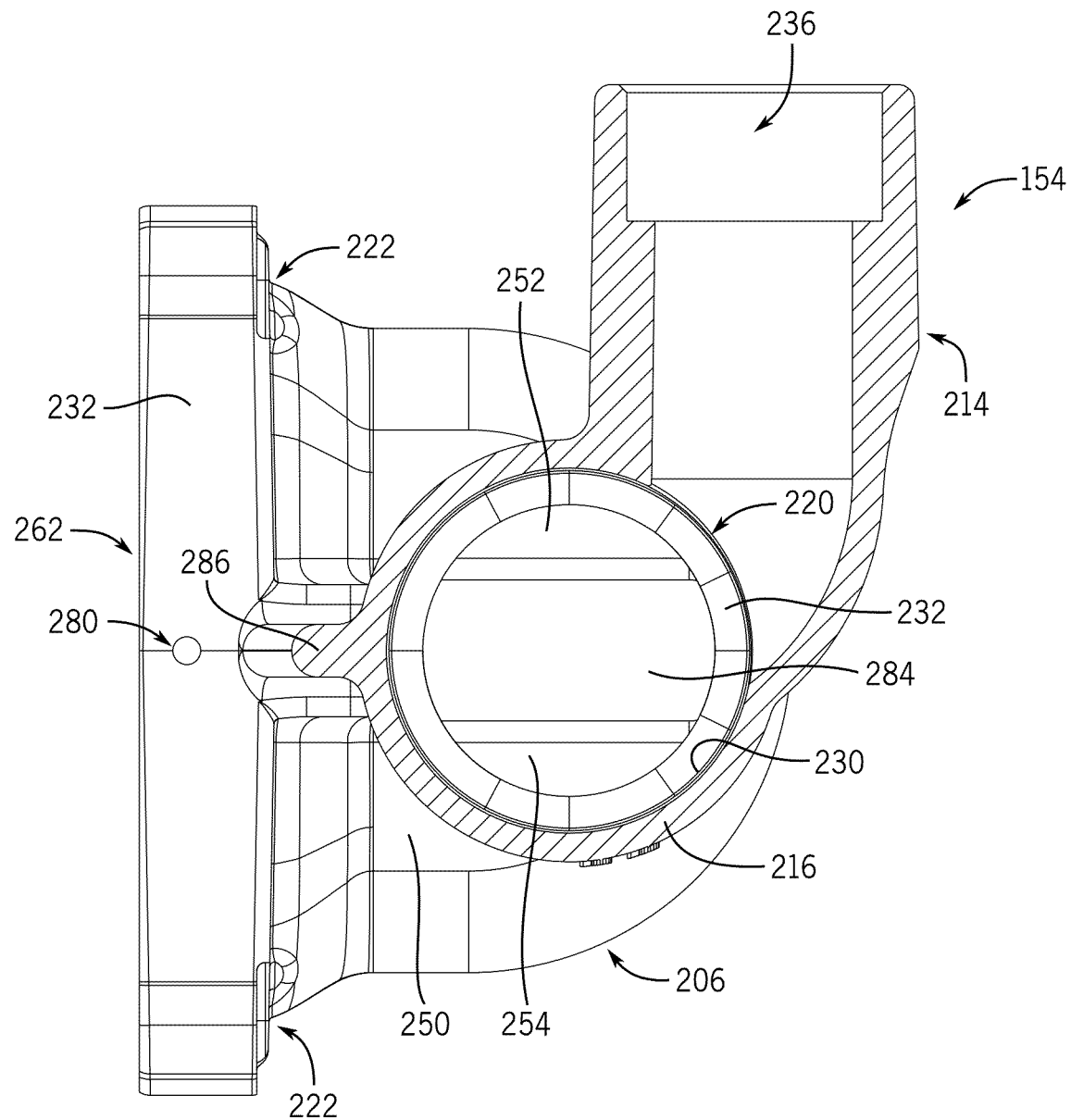
FIG. 7 is a cross-sectional view thereof taken along line 7-7 in FIG. 5.

Referring also to FIGS. 5-9, the manifold chamber 202 includes an opening 226 allowing access to the internal volume of the manifold chamber 202 by sensor 190. The manifold chamber 202 also defines an opening 228 that allows a passage 231 to couple the manifold chamber 202 to a flow sensor. As shown in FIG. 7, the EGR coupling 214 defines the side opening 220. The EGR coupling 214 ends at the internal surface 230 and does not extend past the internal surface 230 into the internal volume of the manifold chamber 202. In an alternative aspect, the EGR coupling 214 extends past the internal surface 230 and into the internal volume of the manifold chamber 202.

The manifold chamber 202 includes a wall 216 that defines an internal volume of the manifold chamber 202. The wall 216 defines an internal surface 230 of the manifold chamber 202. In at least one aspect, the wall 216 extends from the upper opening 218 to a lower opening 238 of the manifold chamber 202. The lower opening 238 is positioned opposite the upper opening 218. In at least one aspect, the lower opening 238 and the upper opening 218 have the same diameter or the same size.

Figure 8:
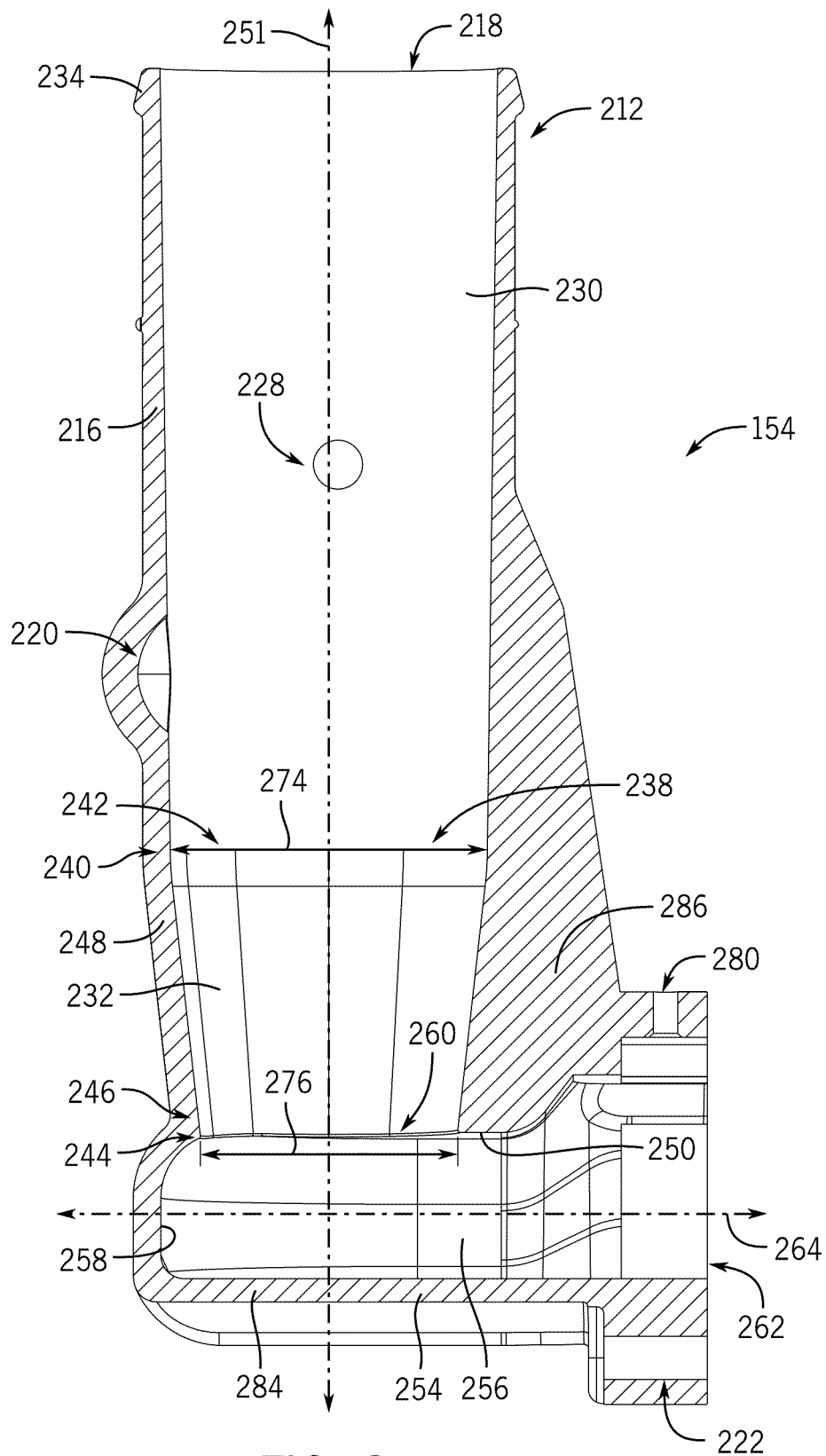
FIG. 8 is a cross-sectional view thereof taken along line 8-8 in FIG. 5.

As shown in FIG. 8, the internal surface 230 is smooth and smoothly transitions to an internal surface 232 defined by a wall 248 of the throat section 204. The wall 216 smoothly transitions to the wall 248. The wall 248 defines an internal volume of the throat section 204 and the internal surface 232. The throat section 204 also includes an upper opening 240 and a lower opening 244 positioned opposite the upper opening 240, where the wall 248 extends from the upper opening 240 to the lower opening 244. The upper opening 240 is positioned at an upper end 242 of the throat section 204 and the lower opening 244 is positioned at a lower end 246 of the throat section 204. The lower opening 238 is adjacent to the upper opening 240 allowing the mixture of fresh air and EGR gas to pass from the manifold chamber 202 to the throat section 204. The internal surface 232 is smooth and goes from the upper opening 240 at the upper end 242 to the lower opening 244 at the lower end 246.

The throat section 204 and manifold chamber 202 define a longitudinal axis 251. The upper opening 218, lower opening 238, upper opening 240, and lower opening 244 are axially aligned with the longitudinal axis 251. The manifold chamber 202 and the throat section 204 both extend along the longitudinal axis 251. For example, the wall 216 and the wall 248 both extend along the longitudinal axis 251. In at least one aspect, the throat section 204 has a longitudinal dimension of 40 mm. In an alternative aspect, the throat section 204 has a longitudinal dimension between 30 mm to 60 mm.

The upper opening 240 is larger than the lower opening 244. For example, the upper opening 240 can have a diameter d1 and the lower opening 244 can have a diameter d2, where diameter d1 is greater than diameter d2. In at least one aspect, diameter d2 is 30% smaller than diameter d1. In an alternative aspect, the diameter d2 is 20% to 50% smaller than diameter d1. The throat section 204 has a gradual diameter reduction from diameter d1 to diameter d2. The lower end 246 has a cross-section of the wall 248 that is less than a cross-section of the upper end 242 of the wall 248. For example, the cross-section of the throat section 204 narrows from the upper end 242 to the lower end 246. As such, the throat section 204 forms an air nozzle within the mixing manifold 154. In an alternative aspect, the throat section 204 can have a constant inner diameter that is less than the diameter of the manifold chamber 202. In either case, the throat section 204 can be used to create an optimum restriction for the mixture of air and EGR gas to create desirable mixing and streamlined flow. In yet another alternative aspect, the upper opening 240 and lower opening 244 can be a different shape than a circle, e.g. an oval, square, rectangular shape, etc.

In at least one aspect, the manifold chamber 202 has a constant inner diameter that is the same as the diameter 274 of the upper opening 240 of the throat section 204. In an alternative aspect, the manifold chamber 202 has an inner diameter that changes along the longitudinal axis 251 and the diameter of the lower opening 238 matches the diameter of the upper opening 242.

The internal surface 232 is smooth and smoothly transitions to an internal surface 252 of the plenum 206. The wall 248 smoothly transitions to the upper wall 250 of the plenum 206. The plenum includes the upper wall 250, a lower wall 254, two side walls 256, and a rear wall 258. The walls 250, 254, 256, 258 define an internal volume and the internal surface 252 of the plenum 206. The plenum 206 includes an upper opening 260 and a front outlet opening 262. The plenum 206 defines a lateral axis 264 that is transverse to the longitudinal axis 251. In at least one aspect, the lateral axis 264 is orthogonal to the longitudinal axis 251. The front outlet opening 262 is position along the lateral axis 264. The upper opening 260 is positioned at the lower opening 244 of the throat section 204. The upper opening 260 is adjacent to the lower opening allowing the mixture of fresh air and EGR gas to pass from the throat section 204 to the plenum 206 and through the plenum 206 out the front outlet opening 262.

The internal surface 252 is smooth and goes from the upper opening 260 to the front outlet opening 262. The front outlet opening 262 is positioned a distance lateral from the longitudinal axis 251. As such, the plenum 206 extends away from the longitudinal axis 251 and along the lateral axis 264. The mixing manifold 154 includes a structural protrusion 286 attached to the plenum 206, throat section 204, and manifold chamber 202 to add structural stability. The structural protrusion 286 is attached to the interface flange 208 and the upper wall 250, where the structural protrusion 286 extends along the upper wall 250 to the wall 248 of the throat section 204 and wall 216 of the manifold chamber 202. In at least one aspect, the structural protrusion 286 is in the shape of a triangle adding more stability.

The upper wall 250, lower wall 254, two side walls 256, and rear wall 258 are formed integrally as a unitary part and define a pancake shaped body. The lower wall 254 spaced from the upper wall 250 by side walls 256. The side walls 256 are spanned by a rear wall 258 positioned opposite the front outlet opening 262. In at least one aspect, the rear wall 258 is curved in the lateral dimensions of the pancake body within a reference plane perpendicular to the longitudinal axis 251. The upper wall 250 is spaced from the lower wall 254 by a longitudinal dimension L1 along the longitudinal axis 251 that is less than a first lateral dimension L2 of the pancake body between the side walls 256. In at least one aspect, the first lateral dimension L2 is two times the diameter d2 and a second lateral dimension L3 is 1.7 times the diameter d2. In an alternative aspect, the first lateral dimension L2 can be greater than 1.5 times the diameter d2 and the second lateral dimension L3 can be greater than 1.5 times the diameter d2. Additionally, in this aspect, the longitudinal dimension L1 can be 0.7 times the diameter d2.

The dimensions L1, L2, and L3 provide the pancake body shape that promotes turbulence in the flow, which is desirable for having a uniform distribution of fresh air and EGR gas in the mixture. The dimensions L2 and L3 being at least 1.5 times the diameter d2 allows the mixture to expand in the plenum 206 after being restricted in the throat section 204. The longitudinal dimension L1 being less than the first lateral dimension L2 and the second lateral dimension L3 is to keep the upper wall 250 and lower wall 254 relatively close to each other to promote the incoming mixture to impact the lower wall 254 and be directed by the lower wall 254 further into the plenum 206. The design and dimensions of the plenum 206 are to promote turbulence for mixing the fresh air and EGR gas of the mixture as discussed more in regard to FIGS. 11-13.

Figure 9:
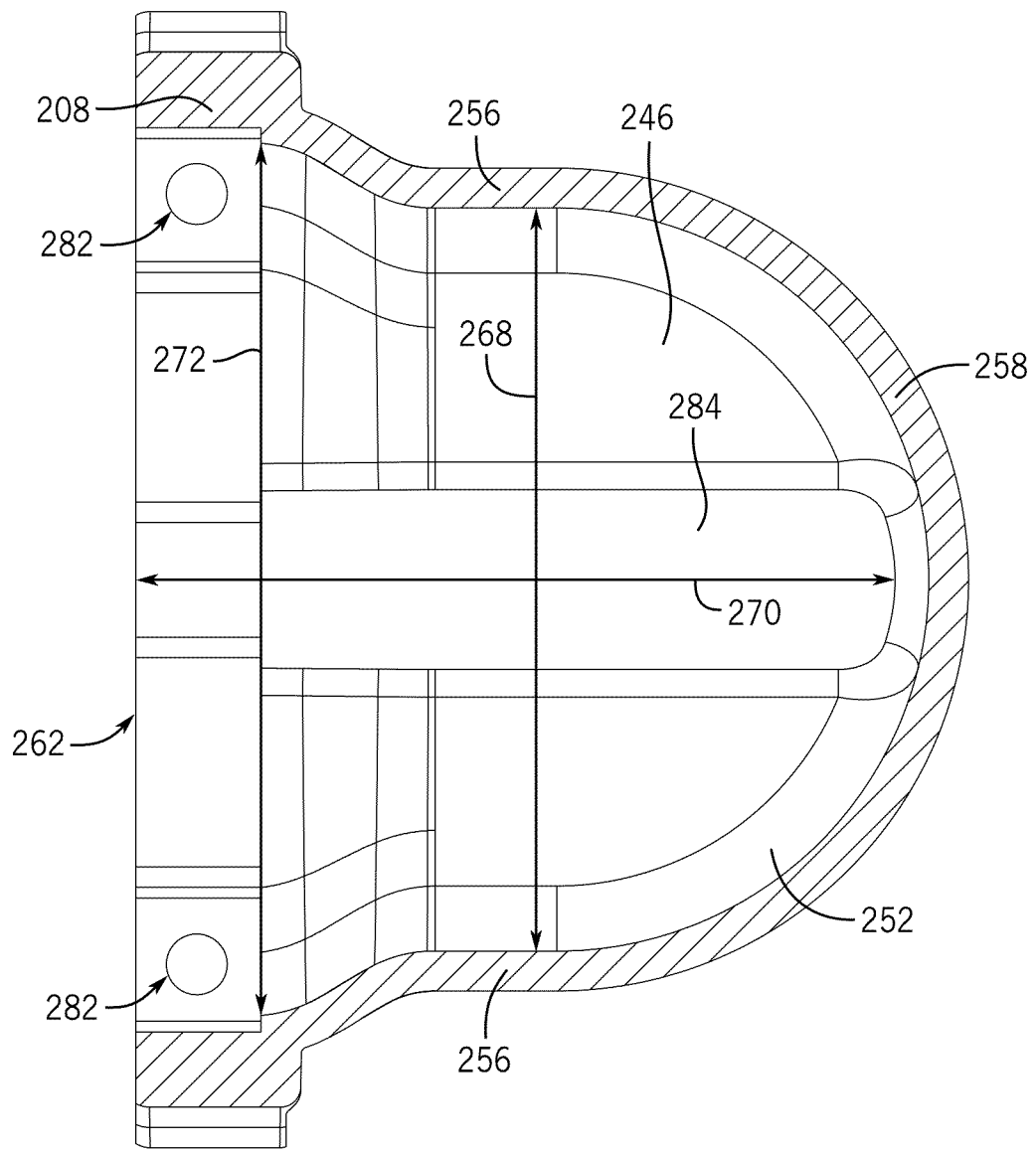
FIG. 9 is a cross-sectional view thereof taken along line 9-9 in FIG. 5.

As discussed previously, the rear wall 258 and side walls 256 are formed integrally as a unitary part and define part of the smooth internal surface 252. The smooth internal surface 252 of the rear wall 258 and side walls 256 are rounded at the upper wall 250 and lower wall 254 in the longitudinal dimension of the plenum 206. The rounded sections on the internal surface 252 allows the mixture to travel along and between the walls 250, 254, 256, and 258. The upper wall 250, lower wall 254, and side walls 256 extend from the rear wall 258 to the front outlet opening 262. The front outlet opening 262 has an oblong shape with a longitudinal dimension 278 measured along the longitudinal axis 251 shorter than a lateral dimension 272 orthogonal to the longitudinal axis 251 and the lateral axis 264. The plenum 206 expands in the longitudinal dimension toward the front outlet opening 262 along the lateral axis 264. The longitudinal dimension 278 at the front outlet opening 262 is greater than the longitudinal dimension 266 between the upper wall 250 and the lower wall 254 at the upper opening 260 and its lateral dimension 272 is greater than the lateral dimension 268 between the side walls 256 at the upper opening 260. Referring to FIG. 9, the side walls 256 expand away from each other toward the front outlet opening 262. Referring to FIG. 8, the upper wall 250 expands away from the lower wall 254 toward the front outlet opening 262. In at least one aspect, referring to FIGS. 5 and 9, the lower wall 254 toward the front outlet opening 262 angles toward the side walls 256.

The front outlet opening 262 includes an interface flange 208 for coupling the mixing manifold 154 to an engine (e.g., engine 120). The interface flange 208 can be coupled to an intake manifold 126 of the engine. The intake manifold 126 could be an integrated intake manifold where the cylinder heads and intake manifold are integrated together, or the intake manifold 126 could be a separate component from the cylinder heads. The interface flange 208 surrounds the front outlet opening 262 to seal the front outlet opening 262 against the intake manifold 126. The interface flange 208 includes bolt holes 222 for coupling the interface flange 208 to the intake manifold 126. The bolt holes 222 are in the lateral dimension of the interface flange 208. The bolt holes 222 could have more or less bolt holes 222 than those shown in FIGS. 3-9 and the positions of the holes 222 could be different. The interface flange 208 also includes holes 282 and a hole 280 each in the longitudinal dimension. These holes 280 and 282 can be used to mount devices onto the manifold at these locations.

In at least one aspect, the interface flange 208 includes a bolt hole 222 in the bottom middle of the interface flange 208. In this aspect, the lower wall 254 can include a rounded protrusion 284 that extends toward the upper wall 250 and extends the length of the lower wall 254 along the lateral axis 264. The rounded protrusion 284 can accommodates the bolt hole 222 in the bottom middle of the interface flange 208. For example, referring to FIG. 8, the rounded protrusion 284 in the lower wall 254 can allow room for a bolt to run the length of the lower wall 254 and be inserted into the bolt hole 222 in the bottom middle of the interface flange 208. The rounded protrusion 284 can be formed by moving a portion of the lowered wall 254 toward the upper wall 250 making room for a bolt. The rounded protrusion 284 is rounded on all sides such that it smoothly transitions from the rounded protrusion 284 to the rear wall 258 and other parts of the lower wall 254.

Figure 10:
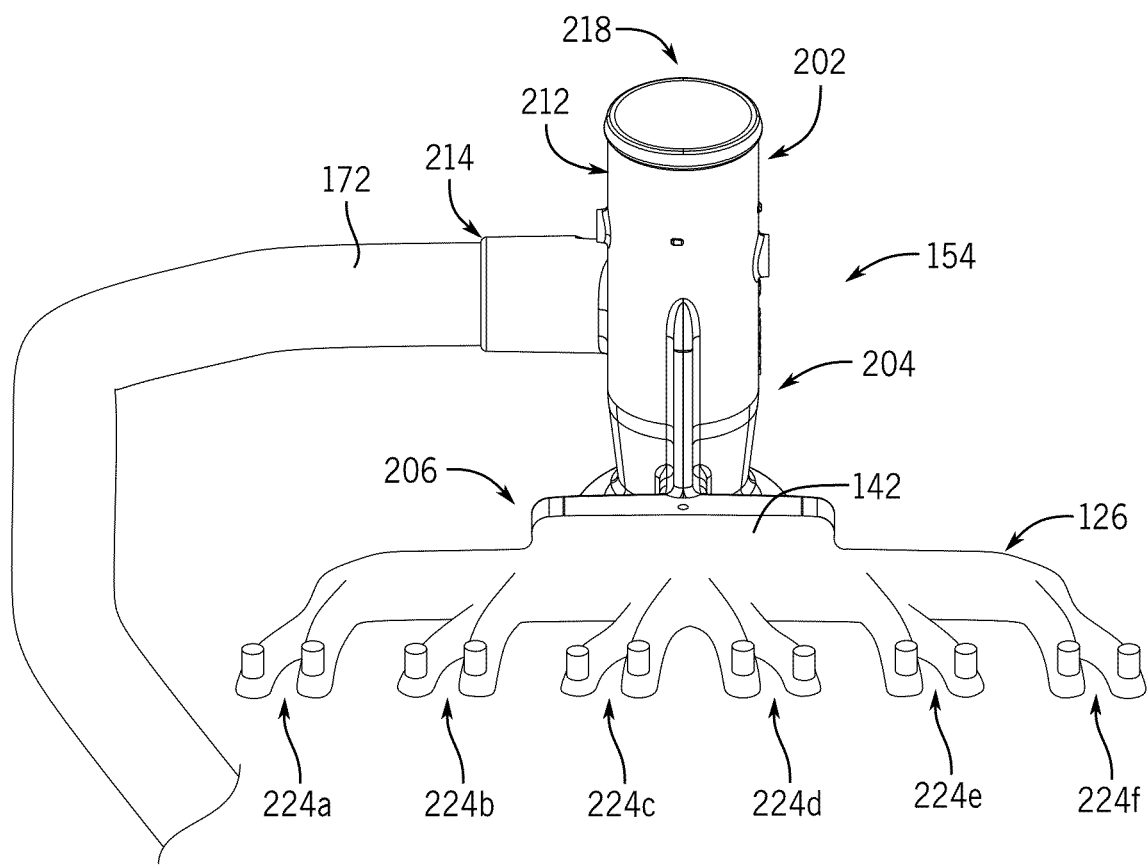
FIG. 10 is a perspective view of the example mixing manifold of FIG. 5 coupled to an integrated intake manifold of the example engine of FIG. 3.

Referring to FIG. 10, fresh air and EGR air received in the manifold chamber 202 form a mixture that passes through the manifold chamber 202, throat section 204, plenum 206, and out the front outlet opening 262. The mixture leaves the front outlet opening 262 and enters into the manifold input 142 of the intake manifold 126 distributing the mixture to the cylinders 224a-224f of the engine 120. In at least one aspect, the interface flange 208 is bolted to the manifold input 142 by bolts 210. In some aspects, the intake manifold 126 is integrated into the cylinder heads of the engine 120. In some alternative aspects, the intake manifold 126 is separate from the cylinder heads. The manifold chamber 202, throat section 204, and plenum 206 have smooth internal surfaces 230, 232, 252 that smoothly transition from one section to the next. These smooth transitions allow the EGR and air mixture to travel smoothly through the mixing manifold 154.

Figure 11:
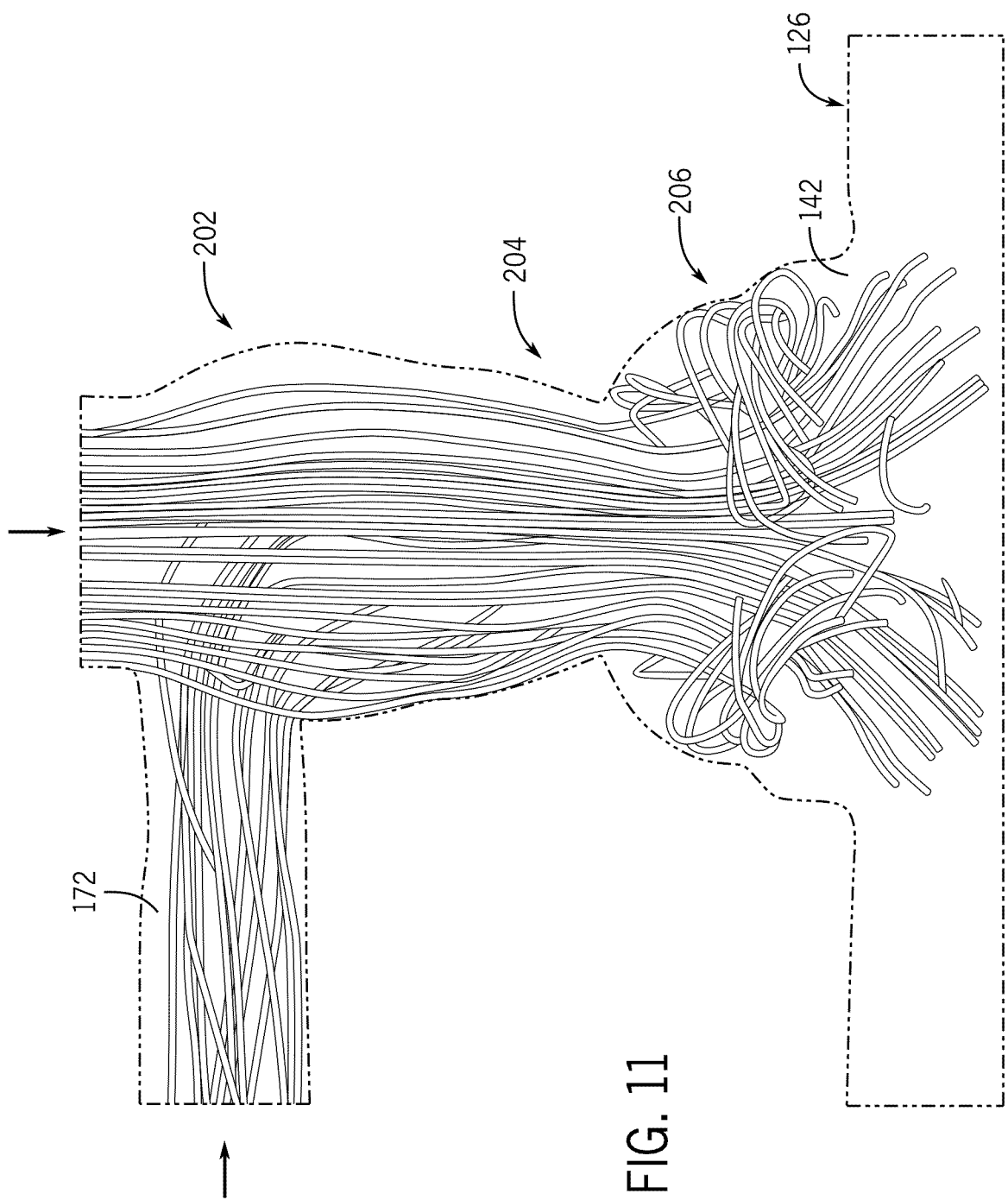
FIG. 11 is an air flow diagram of the air flow through the example mixing manifold of FIG. 5.
Figure 12:
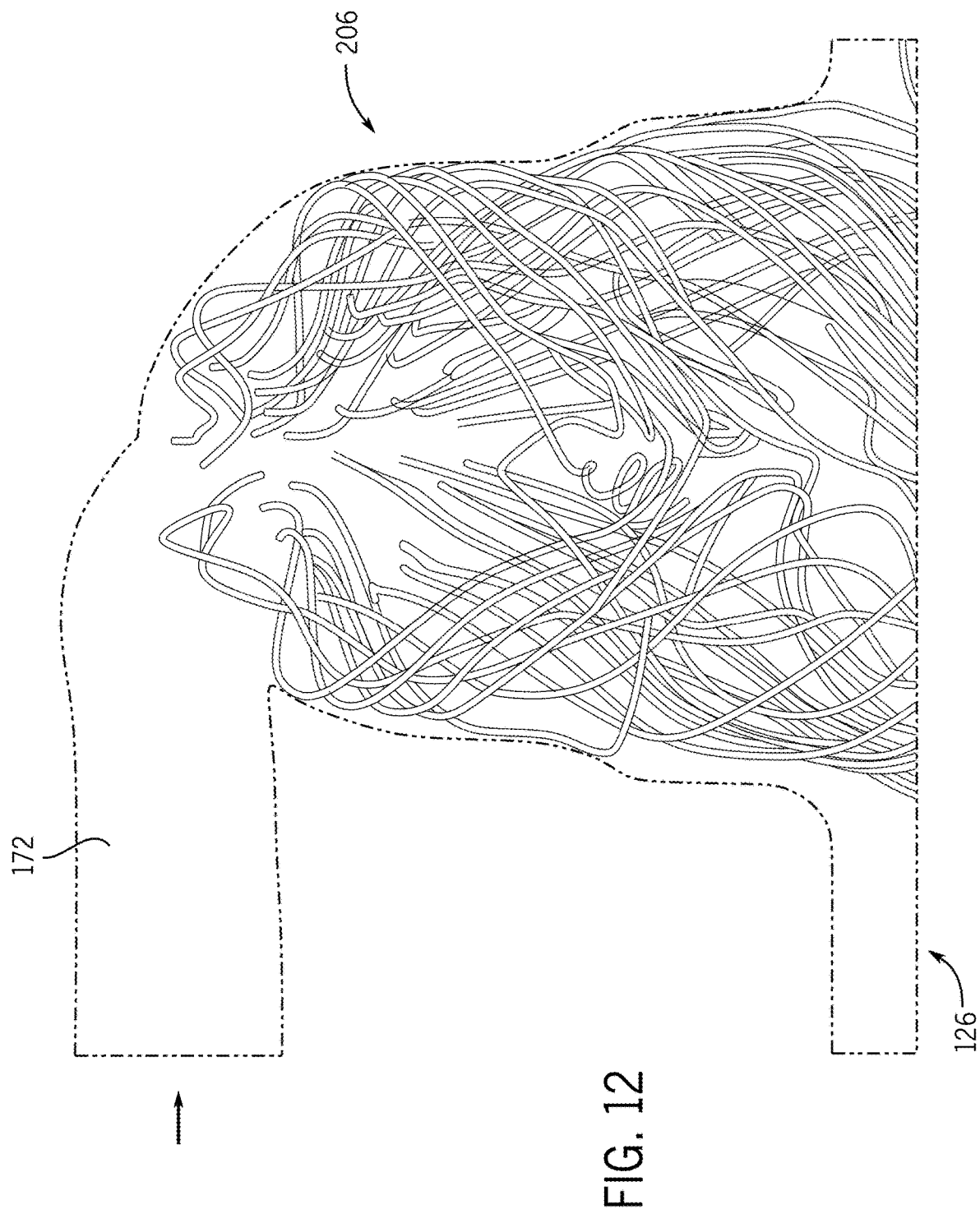
FIG. 12 is another air flow diagram of the air flow through the example mixing manifold of FIG. 5.

Referring to FIGS. 11 and 12, the EGR gas and fresh air enter into the manifold chamber 202 and form a mixture. The mixture travels out a lower opening 238 of the manifold chamber 202 and through an upper end of the throat section 204. The mixture then travels through the throat section 204, where the velocity of the mixture is increased due to the throat section 204 narrowing from the upper end 242 to the lower end 246. For example, the cross-section of the upper end 242 narrows to the cross-section of the lower end 246. The mixture at an increased velocity exits the lower opening 244 of the throat section 204 and enters the upper opening 260 of the plenum 206. The shape of the plenum allows for quick expansion of the mixture following the restriction caused by the throat section 204. The expansion creates turbulence and eddies to promote distribution of the EGR gas and fresh air in the mixture.

The mixture enters through the upper wall 250 and rebounds off the lower wall 254 and is directed in all directions. As shown in FIG. 11, at least a portion of the mixture is directed towards the side walls 256 and rear wall 258 where the mixture follows the side walls 256 and rear wall 258 back to the upper wall 250 and is directed toward the front outlet opening 262. This looping path causes the mixture to spiral toward the front outlet opening 262 promoting a more uniform mixture of the EGR gas and fresh air. In some aspects, there are two spirals with one being on the left side of the front outlet opening 262 and the other being on the right side of the front outlet opening 262. The plenum 206 expands toward the front outlet opening 262 providing more space and promoting the spiraling and mixing to occur. The more uniform mixture then exits the front outlet opening 262 and enters the manifold input 142 of the intake manifold 126.

In at least one aspect, the rounded protrusion 284 extending from the lower wall 254 promotes the looping path creating the spiraling of the mixture. For example, the rounded protrusion 284 can help direct more mixture toward the side walls 256 and rear wall 258 increasing the amount of mixture creating the spiraling. It is noted that even without the rounded protrusion 284 a looping path still occurs causing a spiraling of the mixture.

The narrowing from the manifold chamber 202 to the plenum 206 caused by the throat section 204 creates an optimum restriction which is followed a subsequent expansion in the pancake plenum creating turbulence to promote mixing of the EGR gas and fresh air while still having a streamlined flow. The restriction creates a minor pressure drop from the manifold chamber 202 to the exit of the plenum 206. This pressure drop is small and does not greatly affect engine performance while promoting mixing of the fresh air and EGR gas. In at least one aspect, the pressure drop is 5.5 kPa. In an alternative aspect, the pressure drop is less than 6 kPa.

Figure 13:
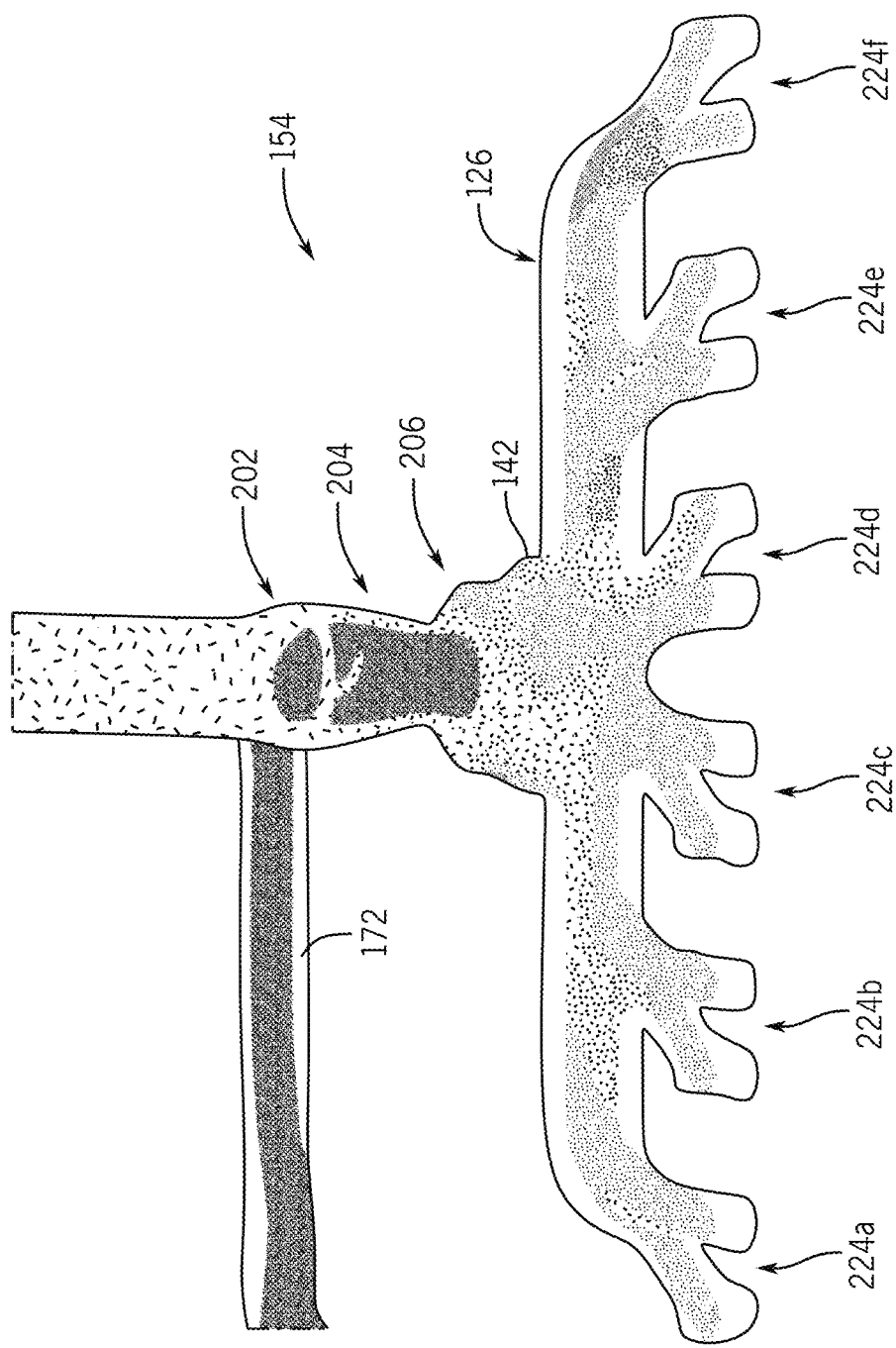
FIG. 13 is a temperature diagram of the air flow through the example mixing manifold of FIG. 5 and the example intake manifold of FIG. 10.

Referring also to FIG. 13, the mixture of EGR gas and fresh air becomes more uniformly distributed as the mixture travels through the mixing manifold 154. The mixture exits the front outlet opening 262 and passes through the intake manifold 126 to reach the cylinders 224a-224f. The EGR gas and fresh air continue to mix as the mixture passes through the intake manifold. The mixture that reaches the cylinder heads 224a-224f are more uniformly mixed over a short mixing distance.

The air flow diagrams of FIGS. 11 and 12 show the flow of the mixture through the mixing manifold 154. The design of the mixing chamber 202, throat section 204, and plenum 206 generate turbulence in the mixture flowing through the mixing manifold 154 promoting the fresh air and EGR air to mix. For example, the restriction of the flow through the throat section 204 causes the velocity of the flow to increase. The increased velocity of the flow causes the mixture to enter the plenum 206 through the upper wall 250 at a higher speed and impact the lower wall 254. The lower wall 254 then directs the mixture further into the plenum 206, where at least a portion of the mixture flows up the side walls 256 and rear wall 258 to reach the upper wall 250 and move toward the front outlet opening 262. This looping path can cause the spiraling of the flow toward the front outlet opening 262 as shown in FIG. 11. The spiraling promotes mixing of the fresh air and EGR gas to get a more uniform mixture. Having a uniform mixture is beneficial to allow the same amount of oxygen to reach each cylinder of the engine allowing improved control of NOX emissions out of the engine. A non-uniform mixture could allow one or more cylinders to get more oxygen than others allowing that one or more cylinders to produce greater than desired NOX emissions.

A mostly uniform mixture of the fresh air and EGR air at the cylinders can be seen in the temperature diagram of FIG. 13. The EGR air enters the mixing chamber 202 through the passageway 172 and the fresh air enters through the top of the diagram. The initial EGR gas is at a greater temperature than the initial fresh air temperature. The fresh air and EGR gas pass through the manifold chamber 202 and throat section 204 where they begin to mix. The plenum 206 shows the mixture temperature becoming more consistent with it becoming a temperature between the initial EGR temperature and the initial fresh air temperature showing that the fresh air is mixing with the EGR gas. The more consistent temperature in the plenum 206 can be due to the flow turbulence that is produced in the plenum 206 as discussed above in regard to FIGS. 11 and 12. The mixture continues to mix as it enters the intake manifold 126 and the temperature of the mixture that enters the cylinders are all relatively the same. The temperature being the same is important to show that the mixture is a uniform distribution of EGR gas and fresh air. If the mixture was non-uniform when entering the cylinders, then there would be a cylinder receiving a portion of the mixture with a greatly different temperature representing a pocket of mostly fresh air or mostly EGR gas. This is not the case as shown in FIG. 13, where each cylinder is receiving the mixture at mostly the same temperature.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Although portions of the disclosure may use the phrase "at least one" or "one or more" of a particular component or element, unless otherwise specifically limited, the mere recitation of a single element or component does not preclude a plurality of such elements or components.

What is claimed is:

1. A mixing manifold for mixing intake air and exhaust gas recirculation (EGR) air in an engine system, the mixing manifold comprising:
   a manifold chamber into which the intake air and the EGR air are received, the manifold chamber being an open, no mix-type chamber devoid of turbulence-inducing passages or devices promoting mixing of the EGR air with the intake air;
   a throat section having an upper end at the manifold chamber and extending to a lower end about a longitudinal axis of the mixing manifold, the lower end having a cross-section that is less than a cross-section of the upper end; and
   a plenum having a pancake body with an upper wall at the lower end of the throat section and a lower wall spaced from the upper wall by side walls defining an interior volume leading from the throat section to a front outlet opening, wherein the upper wall is spaced from the lower wall by a longitudinal dimension along the longitudinal axis that is less than a lateral dimension of the pancake body between the side walls, wherein the front outlet opening is positioned a distance lateral from the longitudinal axis and the lower wall has a rounded protrusion that extends toward the upper wall and along a length of the lower wall.

2. The mixing manifold of claim 1, wherein the front outlet opening has an oblong shape with a longitudinal dimension shorter along the longitudinal axis than a lateral dimension perpendicular to the longitudinal axis.

3. The mixing manifold of claim 2, wherein the plenum expands toward the front outlet opening so its longitudinal dimension at the front outlet opening is greater than the longitudinal dimension between the upper wall and the lower wall at a position on the pancake body at the lower end of the throat section and its lateral dimension is greater than the lateral dimension between the side walls at the position.

4. The mixing manifold of claim 3, wherein the upper wall toward the front outlet opening expands away from the lower wall in the longitudinal dimension.

5. The mixing manifold of claim 2, wherein the plenum includes an interface flange surrounding the front outlet opening with bolt holes for coupling the mixing manifold to an engine of the engine system.

6. The mixing manifold of claim 1, wherein intake air and EGR air enter the manifold chamber and move down through the throat section to the plenum, the plenum causing turbulence in the intake air and EGR air promoting mixing of the intake air and EGR air prior to the mixed intake air and EGR air exiting at the front outlet opening.

7. The mixing manifold of claim 6, wherein a velocity of the intake air and the EGR air is increased through the throat section due to the cross-section of the upper end narrowing to the cross-section of the lower end, wherein the plenum causes the EGR air and the intake air to spiral as the EGR air and intake air move toward the front outlet opening, and wherein the spiraling causes the turbulence in the intake air and the EGR air promoting mixing of the intake air and EGR.

8. The mixing manifold of claim 1, wherein the side walls are spanned by a rear wall opposite the front outlet opening that is curved in the lateral dimension of the pancake body within a reference plane perpendicular to the longitudinal axis.

9. The mixing manifold of claim 8, wherein the rear wall and side walls are formed integrally as a unitary part and define a smooth interior surface; and
wherein the smooth interior surface of the rear wall and the side walls are rounded at the upper wall and lower wall in the longitudinal dimension of the pancake body.

10. The mixing manifold of claim 1, wherein the manifold chamber, the throat section, and the plenum have smooth interior surfaces, and wherein the manifold chamber, the throat section, and the plenum are formed integrally as a unitary part.

11. The mixing manifold of claim 1, wherein the manifold chamber includes an upper opening through which the intake air is received and a side opening through which the EGR air is received, and wherein the upper opening is opposite a lower opening to the throat section.

12. The mixing manifold of claim 11, wherein the upper opening in the manifold chamber couples an intake pipe to the manifold chamber; and
wherein the side opening of the manifold chamber couples to an EGR intake pipe.

13. An air intake arrangement for an engine system, the air intake arrangement comprising: an intake pipe configured to deliver a flow of intake air; an exhaust gas recirculation (EGR) pipe configured to deliver a flow of EGR air; and a mixing manifold for mixing intake air and exhaust gas recirculation (EGR) air in an engine system, the mixing manifold comprising: a manifold chamber into which the intake air from the intake pipe and the EGR air from the EGR pipe are received, the manifold chamber being an open, no mix-type chamber devoid of turbulence-inducing passages or devices promoting mixing of the EGR air with the intake air; a throat section having an upper end at the manifold chamber and extending to a lower end about a longitudinal axis of the mixing manifold, the lower end having a cross-section that is less than a cross-section of the upper end; and a plenum having a pancake body with an upper wall at the lower end of the throat section and a lower wall spaced from the upper wall by side walls defining an interior volume leading from the throat section to a front outlet opening, wherein the upper wall is spaced from the lower wall by a longitudinal dimension along the longitudinal axis that is less than a lateral dimension of the pancake body between the side walls, and wherein the front outlet opening is positioned a distance lateral from the longitudinal axis and the lower wall has a rounded protrusion that extends toward the upper wall and along length of the lower wall.

14. The air intake arrangement of claim 13, wherein the front outlet opening has an oblong shape with a longitudinal dimension shorter along the longitudinal axis than a lateral dimension perpendicular to the longitudinal axis, wherein the plenum expands toward the front outlet opening so its longitudinal dimension at the front outlet opening is greater than the longitudinal dimension between the upper wall and the lower wall of the pancake body and its lateral dimension is greater than the lateral dimension between the side walls of the pancake body, and wherein the plenum expands toward the front outlet opening in the longitudinal dimension away from both the upper wall and the lower wall.

15. The air intake arrangement of claim 14, wherein the plenum includes an interface flange surrounding the front outlet opening with bolt holes for coupling the mixing manifold to an engine of the engine system.

16. The air intake arrangement of claim 13, wherein intake air and EGR air enter the manifold chamber and move down through the throat section to the plenum, the plenum causing turbulence in the intake air and EGR air promoting mixing of the intake air and EGR air prior to the mixed intake air and EGR air exiting at the front outlet opening, wherein a velocity of the intake air and the EGR air is increased through the throat section due to the cross-section of the upper end narrowing to the cross-section of the lower end, wherein the plenum causes the EGR air and the intake air to spiral as the EGR air and intake air move toward the front outlet opening, and wherein the spiraling causes the turbulence in the intake air and the EGR air promoting mixing of the intake air and EGR.

17. The air intake arrangement of claim 13, wherein the side walls are spanned by a rear wall opposite the front outlet opening that is curved in the lateral dimension of the pancake body within a reference plane perpendicular to the longitudinal axis;
wherein the rear wall and side walls are formed integrally as a unitary part and define a smooth interior surface; and
wherein the smooth interior surface of the rear wall and the side walls are rounded at the upper wall and lower wall in the longitudinal dimension of the pancake body.

18. The air intake arrangement of claim 13, wherein the manifold chamber, the throat section, and the plenum have smooth interior surfaces, and wherein the manifold chamber, the throat section, and the plenum are formed integrally as a unitary part.

19. The air intake arrangement of claim 13, wherein the manifold chamber includes an upper opening through which the intake air is received and a side opening through which the EGR air is received, and wherein the upper opening is opposite a lower opening to the throat section, wherein the upper opening in the manifold chamber couples the intake pipe to the manifold chamber; and wherein the side opening of the manifold chamber couples to the EGR pipe.

\* \* \* \* \*